June 22, 1954  R. S. ARKLESS  2,681,685
PLASTIC WELDING DEVICE
Filed July 1, 1952
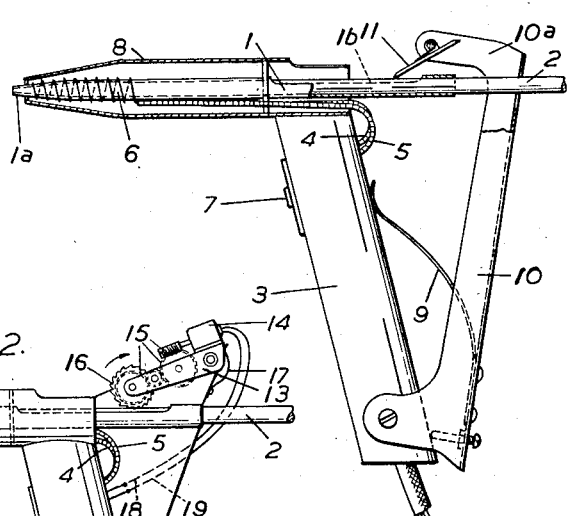
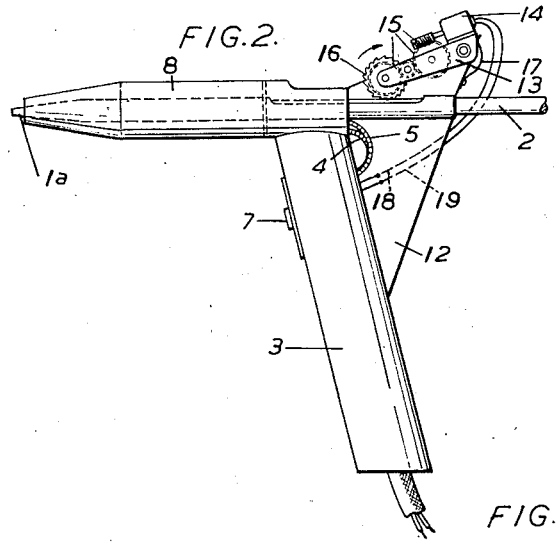
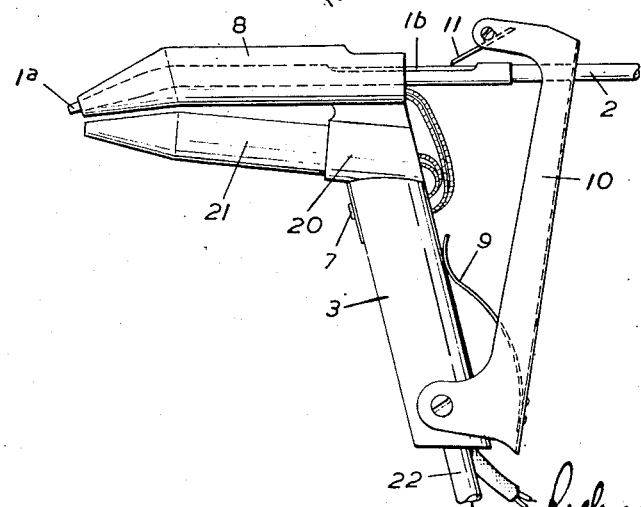
Inventor
Richard S. Arkless
By Alexander Powell
Attorneys Patented June 22, 1954

2,681,685

UNITED STATES PATENT OFFICE 2,681,685

PLASTIC WELDING DEVICE

Richard Smurthwaite Arkless, Billingham-on-Tees, England

Application July 1, 1952, Serial No. 296,591

6 Claims. (Cl. 154—42)

This invention consists in an improved plastic extrusion welding device of the kind comprising a cylinder or tube for containing a thermoplastic material or filler, a heating coil around the said cylinder for reducing the filler to a malleable state so that under pressure it is easily extruded from the end of the cylinder, and means for exerting pressure on the filler. An example of such a welding device is described in my U. S. patent specification No. 2,556,609.

In the above specification the pressure on the filler is exerted by means of a piston working in a cylinder containing the filler, the area of the cylinder being substantially greater than the area of the extrusion, while the exertion of pressure was effected intermittently by means of a lever arm pivotally mounted on the handle of the device and having its free end adapted to engage with a piston rod secured to the piston, in such a way that on the inward stroke it engaged the rod to force it inwards against the filler, but on its outward stroke it moved over the piston without effect.

The object of the present invention is to provide an improved form of device in which the piston is dispensed with, and if desired a continuous feed of the filler carried out with a substantially lower pressure than was necessary with the above piston feed.

According to the invention, the feed of the filler is effected by means of a feeding member which is in continuous and direct engagement with the filler, and means are provided for imparting movement to the feeding member.

According to one form of the invention, the feed member comprises a pawl-like member—hereinafter referred to as the "pawl"—which is pivotally mounted on the free end of a swinging arm which in its turn is pivotally mounted on the handle of the device, with its free end adapted to embrace a length of filler, while the free end of the pawl is adapted to engage with the filler direct when the arm is swung inwards but to slide freely over the filler during the return stroke of the arm.

The invention will now be described by way of example with reference to the accompanying drawings.

In the said drawings:

Fig. 1 is a partial sectional elevation of a device in which the filler is fed intermittently.

Fig. 2 is a view in elevation of a form of device in which the filler is fed continuously.

Fig. 3 is a partial sectional elevation showing the device shown in Fig. 1 combined with a heater gun.

Referring more particularly to Fig. 1, the cylinder for containing the filler consists in a circular section tube 1 having its inside diameter about ¼" to take a ¼" filler rod 2, and its one end tapered down to ⅛" to form a discharge orifice 1a. Towards its rear the upper portion of the tube is cut away at 1b to expose the upper portion of the filler rod 2, but the rear end is uncut.

The tube 1 is mounted on the upper end of a hollow handle 3 through which lead wires 4, 5 are passed for connexion to a heater coil 6 wound around the tapered or nozzle end of the tube 1. A micro-switch 7 is arranged in the front of the handle 3 for controlling the current to the heater coil 6. A shaped cylindrical sheath 8 is passed over the nozzle end 1a of the tube 1, the diameter of the sleeve being such as to leave an annular space about the tube 1 and heater coil 6.

Pivotally mounted at the lower end of the handle 3 against a spring 9 which normally holds it away from the handle, is a feed lever 10 which extends upwards to terminate in a bifurcated portion 10a to embrace the cut-away portion 1b of the tube 1. Pivotally mounted at the upper end of the bifurcations 10a, and inclined downwards in the direction of the nozzle 1a, is a spring-pressed pawl 11 having its lower edge chamfered to enable it to bite into the filler rod 2.

In operation, a rod of filler plastic is inserted in the rear end of the tube 1 and pushed until its end abuts against the tapered or nozzle portion of the tube 1, the pawl riding over the exposed portion of the rod 2 as it is pushed home. When the device is to be used, the micro-switch 7 is switched on, and the feed lever 10 squeezed towards the handle 3. When the heat from the heating coil 6 has penetrated to the rod 2, the latter softens and the pressure of the feed lever 10 on the rod 2 through the pawl 11 causes the rod 2 to move forward towards the nozzle 1a. The feed lever 10 is then released, when its spring 9 will restore it to the outer or initial position during which movement the pawl 11 rides over the rod 2 without having any effect. The lever is again squeezed, so that the pawl 11 again digs into the rod 2 with the result that the rod is again fed. The softened rod emerges from the nozzle 1a at a reduced diameter and is ready for application to the desired welding job.

This form is particularly adapted for use in the field, for example, for joining individual conductors in a telephone cable.

For larger diameter rods requiring substantially greater pressure for effecting the feed, instead of the manually operated intermittent feed above described, a power operated feed may be provided. Fig. 2 shows semidiagrammatically such a feed. According to this arrangement the lever 10 is dispensed with, and instead, a bifurcated bracket 12 rigid with the handle 3 has mounted between its bifurcations a rockable frame 13 having thereon a fractional horsepower motor 14 which drives through a train of reduction gearing 15a a toothed wheel 16 which bites into the rod 2 as a result of the pressure of a spring 17. The motor may be controlled by a further movement of the switch 7 when the filler has been sufficiently softened. 18, 19 are the leads from the switch 7 to the motor 14.

In lighter weight forms of the moulding device the continuous feeding of the plastic rod may be effected as above described with a clockwork motor taking the place of the electric motor, the motor spring being wound up by means of an oscillating feed lever such as the lever 10 which operates a pawl over a ratchet wheel connected to the one end of the motor spring.

For welding plastic materials, more heat is required for rendering the adjacent portions of the material malleable. For this kind of work the above forms of the device may be combined with a heater gun as is the cylinder in the specification above referred to, the electrical connections and control being identical. Fig. 3 shows one form of construction of such a combination in which the tube 1, handle 3, lever 10 and their associated parts are the same as in Fig. 1. However, at the upper end of the handle 3 there is rigidly secured a transverse tubular socket 20 in which a hot air gun 21 is mounted substantially as described in the above U. S. specification No. 2,556,609, air being led to it through the pipe 22 which is adapted to be connected to an air supply. The sheath 8 is rigidly mounted on a bracket 23 which is itself rigidly mounted on the socket 20. Both heating coils are controlled from the micro-switch 7.

I claim:

1. An improved plastic extrusion welding device comprising a tube adapted to contain the front end portion of a length of thermo-plastic filler rod, the front end of said tube being tapered down to form a discharge orifice, said tube being slotted at its upper side adjacent its rear end to expose a short length of the upper portion of said filler rod, a feeding member adapted to be in continuous and direct engagement through said slotted portion with the upper side of the plastic filler rod, an electric heater coil wound around the nozzle end of said tube, and switching means for controlling said heater coil.

2. A welding device according to claim 1, comprising a handle, a swinging arm pivotally mounted on said handle with its free end adapted to embrace a length of filler, a pawl pivotally mounted on the free end of said swinging arm, the free end of said pawl being adapted to engage with the filler direct when said swinging arm is swung inwards but to slide freely over the filler during the return stroke of said arm.

3. A welding device according to claim 1, comprising means for imparting continuous movement to the feeding member.

4. A welding device according to claim 1, comprising a toothed wheel rotatably mounted on the device adapted to engage with the filler, an electric motor on said device, and reduction gearing for transmitting the drive to said toothed wheel.

5. A welding device according to claim 1, comprising a swinging frame on said device, a toothed wheel at the free end of said frame, said toothed wheel being adapted to engage with the filler, an electric motor on said frame, and reduction gearing on said frame for transmitting the drive to said toothed wheel, and means for resiliently pressing said frame towards the filler.

6. A welding device according to claim 1 comprising a toothed wheel rotatably mounted on the device and adapted to engage the filler, a clockwork motor on said device, a spring in said motor, a ratchet wheel connected to an end of said spring, a feed lever on said device, a pawl on said feed lever, said pawl being adapted to engage said ratchet wheel, and reduction gearing for transmitting the drive to said toothed wheel.

References Cited in the file of this patent

UNITED STATES PATENTS

| Number | Name | Date |
|---|---|---|
| 1,893,093 | Linville et al. | Jan. 3, 1933 |
| 2,220,545 | Reinhardt | Nov. 5, 1940 |
| 2,228,291 | Weston | Jan. 14, 1941 |
| 2,372,737 | Phillips | Apr. 3, 1945 |
| 2,556,609 | Arkless | June 12, 1951 |

FOREIGN PATENTS

| Number | Country | Date |
|---|---|---|
| 481,669 | Great Britain | Mar. 15, 1938 |